United States Patent [19]

Kanamaru

[11] 4,287,413
[45] Sep. 1, 1981

[54] AUTOMATIC FOCUS SERVOMECHANISM IN OPTICAL INFORMATION READING DEVICE

[75] Inventor: Hitoshi Kanamaru, Saitama, Japan

[73] Assignee: Universal Pioneer Corporation, Tokyo, Japan

[21] Appl. No.: 48,421

[22] Filed: Jun. 14, 1979

[30] Foreign Application Priority Data

Jun. 16, 1978 [JP] Japan ................................ 53-73524

[51] Int. Cl.³ ............................................. G01J 1/36
[52] U.S. Cl. ...................................... 369/45; 250/204; 369/112
[58] Field of Search ............... 250/201, 204, 209, 578; 179/100.3 V, 100.3 G, 100.1 G

[56] References Cited

U.S. PATENT DOCUMENTS

| 4,025,949 | 5/1977 | Whitman | 250/201 |
| 4,059,841 | 11/1977 | Bricot et al. | 179/100.1 G |
| 4,079,247 | 3/1978 | Bricot et al. | 250/201 |
| 4,123,652 | 10/1978 | Bouwhuis | 179/100.3 V |
| 4,163,149 | 7/1979 | Sawano et al. | 250/204 |

*Primary Examiner*—David C. Nelms
*Attorney, Agent, or Firm*—Sughrue, Rothwell, Mion, Zinn and Macpeak

[57] ABSTRACT

A focus servo apparatus for an optical information reading system is disclosed, which includes an optical system for a light from an information carrying surface of a recording medium composed of a condenser lens, a cylindrical lens and a light receiving element. A subsystem is employed for maintaining light illuminating focussed on the information carrying surface in response to an output of the light receiving element. The distance between the cylindrical lens and the light receiving element is larger than the focus distance of the lenticular lens.

8 Claims, 17 Drawing Figures

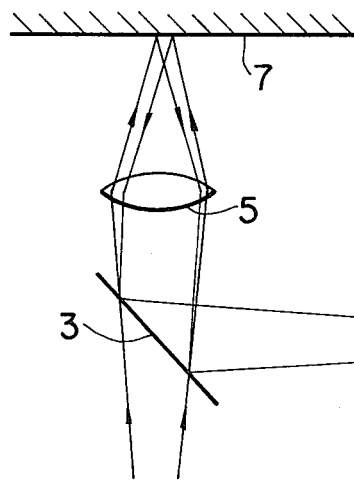
FIG. 5(a)
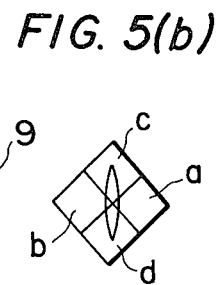
FIG. 5(b)
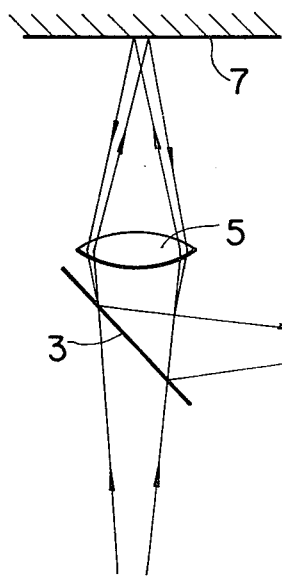
FIG. 6(a)
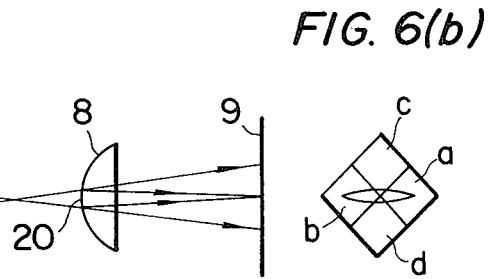
FIG. 6(b)
FIG. 7
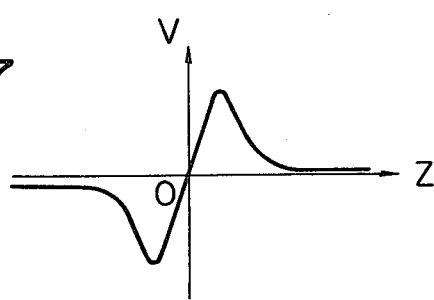

AUTOMATIC FOCUS SERVOMECHANISM IN OPTICAL INFORMATION READING DEVICE

BACKGROUND OF THE INVENTION

This invention relates to an automatic focus servomechanism in an optical information reading device. More particularly, it relates to a focus servomechanism of a convergence lens for converging a bundle of irradiation rays onto an optical information recording medium such as a video disc for use in an optical information reading device of an optical type video disc reproducing system.

In FIGS. 1(a) and 1(b) which are partial plan view of a video disc and a partial cross-sectional view of the video disc, respectively. Reference numeral 6 designates a disc substrate made of transparent materials having on one surface video and/or audio information recorded in the form of pits 17 to form a convolution track or a concentric track. In the video disc, the length of pit and the distance between the pits represent the video and/or audio information. In order to increase reflection efficiency of the video disc, a reflection layer 7 is deposited on one surface of the disc substrate 6 provided with the information patterns in the form of pits 17 for instance by vapor deposition of aluminum. A protection layer 18 is further deposited over the reflection layer 7.

A reading operation of the video and/or audio information recorded on the video disc is carried out by the steps of irradiating the video disc from the other surface of the video disc having no convolution or concentric track, receiving the reflected rays from the reflection layer 7 modulated due to an existance of pit patterns and demodulating the reflected rays to produce the video and/or audio information.

In such an optical information reading device for reading the video and/or audio information recorded on the video disc, a focus servomechanism of a convergence lens has been provided, so that the irradiation rays can be converged to thereby form a fine spot onto the surface of the video disc with high accuracy.

In FIG. 2, a schematic diagram showing the above described focus servomechanism of the convergence lens, a bundle of rays emitted from a light source 1, such as He-Ne laser or the like, passes through a collimating lens 2, a beam splitter 3 and a movable mirror 4. The rays are then converged to form a fine spot in the vicinity of the reflection layers 7 of the video disc by a convergence lens 5. The video disc is rotated by a electric motor 14 at a high rotation speed. The irradiation rays are modulated by the pits 17 to read out the information recorded on the video disc and are reflected by the reflection layer 7, so that the reflected rays follows in the reverse course to the beam splitter 3. The reflected rays are deflected by the beam splitter 3 toward a light receiving element 9 where an optical signal is converted into an electrical signal.

One of the problems in such a system is that it is extremely difficult to shape both surfaces of the disc substrate 6 completely flat. Furthermore, when the video disc is set on a drive shaft of the drive motor 14, there is a possibility that the video disc may be orientated to the drive shaft not in a perpendicular alignment. It is a usual condition that the video disc will not be orientated with respect to the drive shaft in a position plane having the drive shaft perpendicular to that plane. The above difficulties cause the reflection layers 7 to undulate in a vertical direction of the system shown in FIG. 2 according to the rotation of video disc. Accordingly, in order to read out the information recorded on the video disc accurately, it is necessary to instantaneously change the position of the convergence lens 5 in the vertical direction to follow the vertical movement of the reflection surface 7, such that the irradiation rays always converge to thereby form a fine spot in the vicinity of the reflection layer 7. To this end, it has been considered that a cylindrical lens 8 may be disposed on an optical path where the reflected rays by the reflection layer 7 converge by the convergence lens 5. In this case, the cylindrical lens 8 is disposed, as shown in FIG. 2, so that a principle point 20 of the cylindrical lens 8 is located at a convergence point of the reflected rays or in the vicinity thereof.

A light receiving means 9 is disposed behind the cylindrical lens 8 to receive the reflected rays. The light receiving means 9 is made up of four light receiving elements 9a, 9b, 9c and 9d as shown in FIG. 3. The vertical axis passing through the center of the light receiving means 9 coincides with an optical axis of the cylindrical lens 8. As shown in FIG. 3, the light receiving means is arranged in such a manner that it is turned 45° with respect to the center axis thereof. The positional relation between the recording surface 7 and the focus point of the condenser lens 5 is determined by detecting and measuring the cross sectional profile of the light projected onto the four light receiving segments a-d of the light receiving element 9 while utilizing the fact that light portions passing through different portions of the lens are focussed at different points on the optical axis thereof.

The automatic focus servomechanism in the conventional optical information reading device will now be described with reference to FIGS. 2 to 7. The light receiving means 9 is located, so that in the case where the irradiation rays converge to thereby form the fine spot on the recording surface of the video disc accurately, the reflected rays from the convergence point passing through the cylindrical lens 8 form a circular image as shown in FIG. 4(b) on the light receiving surface thereof. Under this condition, the outputs Va, Vb, Vc and Vd of the light receiving elements 9a, 9b, 9c and 9d are equal each other, and therefore the following equation can be obtained:

$$Va + Vb = Vc + Vd$$

Accordingly, the output V of a differential amplifier 10 to which the sum of Va and Vb and the sum of Vc and Vd are applied as differential inputs, will have a zero output. As a result, no outputs of an amplifier 11 and a convergence lens drive circuit 12 appear at their respective output terminals. Hence, the position of the convergence lens 5 is not shifted.

As shown in FIG. 5, when the irradiation rays are focused at a point in rear of the reflection layer 7 by the convergence lens 5, the image projected through the lenticular lens 8 onto the light receiving surface has a shape shown in FIG. 5(b). This is because the reflection layer 7 approaches the convergence lens 5 due to the undulation of the video disc or the bad setting of the video disc to the drive shaft. Therefore, the sum of the outputs Va and Vb is less than that of the outputs Vc and Vd thereby resulting in the fact that the output V of the differential amplifier 10 is less than zero.

Conversely, as shown in FIG. 6, when the irradiation rays are focused at a point in front of the reflection layer 7 by the convergence lens 5, the image projected through the cylindrical lens 8 onto the light receiving surface has a shape shown in FIG. 6(b). This is because the reflection layer 7 is displaced away from the convergence lens 5. Therefore, the sum of the outputs Va and Vb is larger than that of the outputs Vc and Vd, thereby resulting in the fact that the output V of the differential amplifier 10 is larger than zero.

Assuming that "Z" equals zero in the case where the irradiation rays are focused on the recording surface of video disc, that is, the reflected rays are focused at a principle point 20 or the cylindrical lens as shown in FIG. 4, and further the "Z" is larger than zero in the case where the reflection layer 7 is displaced away from the convergence lens 5, that is, the reflected rays are focused in front of the principle point 20 of the cylindrical lens 8, the output V of the differential amplifier 10 shows a waveform shown in FIG. 7. The output V of the differential amplifier 10 is applied as an error indication signal to the amplifier 11 to be amplified, whereafter the amplified output of the amplifier is applied to the lens drive circuit 12 the operable to change the position of the convergence lens 5 according to the error indication signal. This is accomplished by actuating a lens holder 13 supporting the convergence lens 5. An automatic focus servo operation is carried out in the above described manner.

However, the above-described focus servomechanism is disadvantageous in that it is difficult to always obtain a so-called S-shaped output characteristic curve as shown in FIG. 7 regardless of the position of the light receiving means 9. This is because the shape of image projecting onto the light receiving surface of the light receiving means 9 changes in accordance with the relative position of light receiving element 9 with respect to the cylindrical lens 8. As a result, sufficient automatic focus servo operation is not attained according to such a conventional focus servomechanism.

SUMMARY OF THE INVENTION

Accordingly, an object of this invention is to obviate the above difficulties accompanying the conventional automatic focus servomechanism.

Another object of this invention is to provide an improved focus servomechanism for use in an optical information reading device, which is capable of achieving an automatic focus servo operation with high accuracy by determining the position of a light receiving means preferably.

These and other objects of this invention are accomplished in an automatic focus servomechanism wherein a distance D between a cylindrical lens and a light receiving means is determined to be larger than a focal distance F of the cylindrical lens, and more preferably the distance D is determined to be approximately twice as large as the focal distance F.

A preferred embodiment of this invention will now be described with reference to the accompanying drawings.

BRIEF DESCRIPTION OF THE DRAWINGS

In the accompanying drawings:

FIGS. 4(a), 5(a) and 6(a) are schematic diagrams showing the optical path of a bundle of rays from a light source to the light receiving means, respectively;

FIGS. 4(b), 5(b) and 6(b) are schematic diagrams showing the shapes of images projected onto the light receiving means, respectively.

FIG. 7 is a graphical representation showing an output characteristic of the differential amplifier versus the position of a conjugate point of a reflection surface with respect to a convergence lens;

DETAILED DESCRIPTION OF THE PREFERRED EMBODIMENTS

Figure 8A:
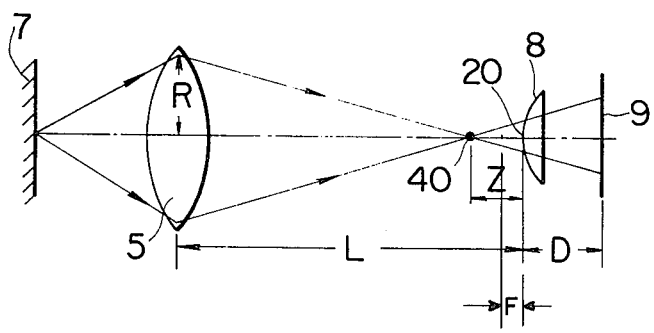
FIG. 8(a) is a schematic diagram of a description of the principle of this invention showing the optical path of a bundle of rays from a reflection layer to the light receiving means.

FIG. 8(a) is a schematic diagram of a description of the principle of this invention, showing the optical path of a bundle of rays from a reflection surface 7 to the light receiving surface of a light receiving element 9. Optical elements and electric elements which have been described hereinbefore are respectively designated by the same reference numerals.

Figure 8B:
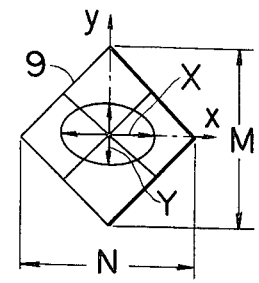
FIG. 8(b) is a schematic diagram showing the shape of an image projected onto the light receiving means.

As is apparent from FIG. 8(a), it is assumed that the radius of lens aperture of a convergence lens 5 is "R". The distance between principle points of the convergence lens 5 and a cylindrical lens 8 is "L". The distance between the principle point 20 of the cylindrical lens 8 and a conjugate point 40 of the reflection surface 7 with respect to the convergence lens 5 is "Z". The distance between the principle point 20 of the cylindrical lens 8 and the light receiving surface of the light receiving means 9 is denoted as "D". The focal distance of arcuate surface of the cylindrical lens 8 is "F". As shown in FIG. 8(b), it is further assumed that the horizontal length and the vertical length of an image projected onto the light receiving surface of the light receiving means 9 by the optical system shown in FIG. 8(a) are "X" and "Y", respectively. The horizontal length S and the vertical length Y can be represented by the following equations, respectively:

$$X = \left| 2 \cdot \frac{(F-D) \cdot Z + F \cdot D}{F \cdot (Z-L)} \cdot R \right|$$
$$= \left| 2R \cdot (1 - D/F) \cdot \frac{F \cdot D/(F-D) + Z}{L - Z} \right| \quad (1)$$

$$Y = \left| 2R \cdot \frac{D + Z}{L - Z} \right| \quad (2)$$

where, "X" represents the length of image projected onto the light receiving surface in a direction parallel to a longitudinal axis of the cylindrical lens 8, and "Y" represents the length thereof in a direction perpendicular to the longitudinal axis of the cylindrical lens 8.

Figure 1A:
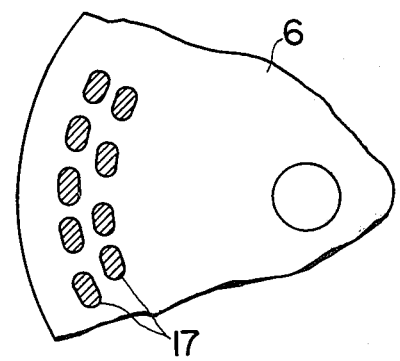
FIG. 1(a) is a partial plan view illustrating a video disc.
Figure 1B:
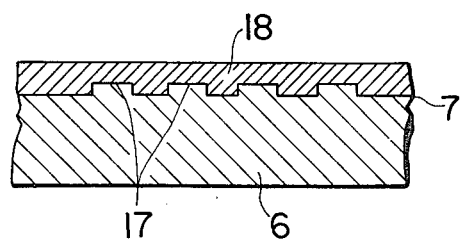
FIG. 1(b) is a partial cross-sectional view of the video disc.
Figure 2:
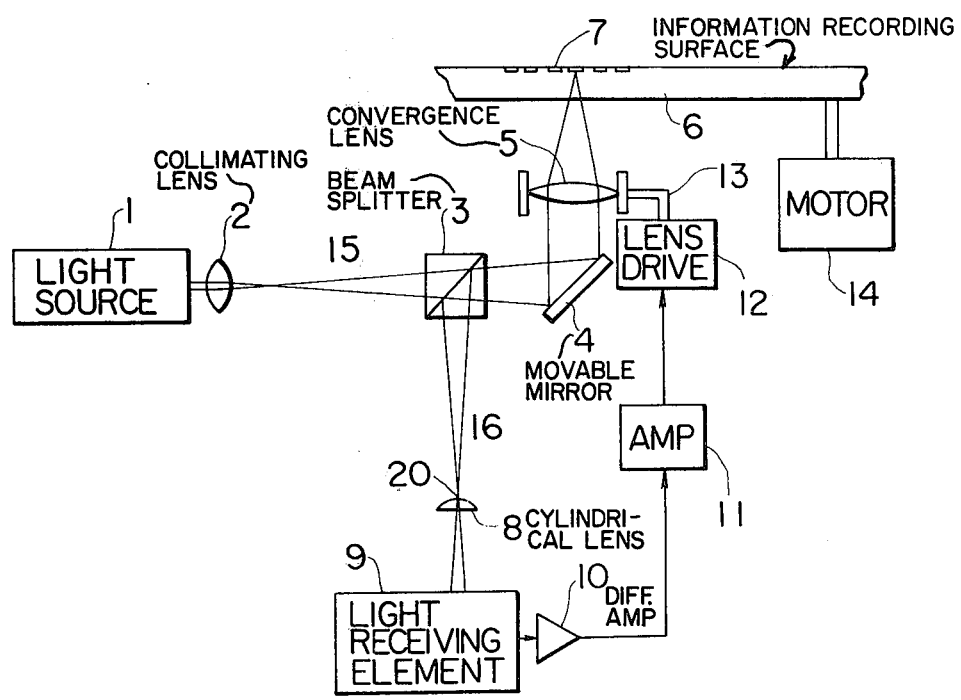
FIG. 2 is a schematic diagram showing an automatic focus servomechanism.
Figure 3:
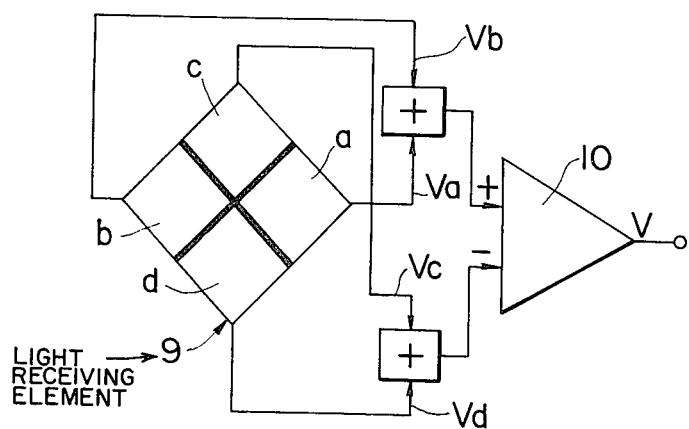
FIG. 3 is a circuit diagram showing a relationship between a light receiving means and a differential amplifier.
Figure 4A:
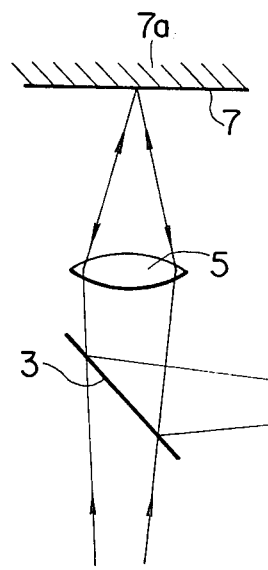
Figure 4B:
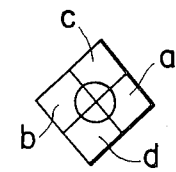

In case of Z=0, that is, in the case where the principle point 20 of the cylindrical lens 8 coincides with the conjugate point 40 as shown in FIG. 4(*a*), the shape of the projected image is substantially circular as shown in FIG. 4(*b*). Therefore, taking into account the fact that, if "Z" equals to zero, "X" is equal to "Y", the above equations are obtained. It should be noted that a right term of the equation (1) is modified as function of "Z" to thereby make it more easy to plot the "Z" on a horizontal axis in graphical representations shown in FIGS. 9(*a*) to 9(*d*).

FIGS. 9(*a*) to 9(*b*) are graphical representations plotting the "X" and "Y" on the vertical axis versus the "Z" on the horizontal axis of the characteristic curves produced by the optical system according to this invention. In case of D>F, the characteristic curve is shown in FIG. 9(*a*). Similarly, in case of D=2F, D=F and D<F, the characteristic curves are shown in FIGS. 9(*b*) to 9(*d*), respectively.

Referring to FIG. 7, it is clear that the positive and negative peaks on the curve occur at points where both X and Y are zero respectively and the positions of the peaks on Z axis are symmetrical with respect to Z=0 (I.E., X=Y). Hence, the cases shown in FIGS. 9*a* and 9*b* satisfy the above conditions and the cases in FIGS. 9*c* and 9*d* do not satisfy them. Particularly, in the cases in FIGS. 9*c* and 9*d,* there are two points on the Z axis where X=Y, causing those conditions to be unsuitable for use.

Figure 9A:
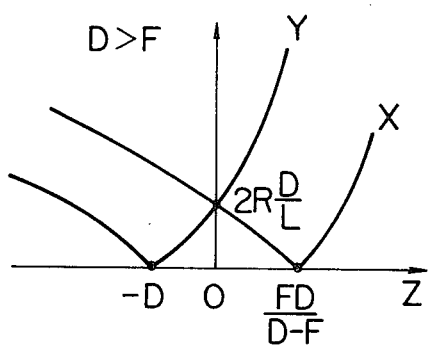
FIGS. 9(a) to 9(d) are graphical representations each plotting the length "X" of an image in an x direction shown in FIG. 8(b) and the length "Y" of an image in a y direction shown in FIG. 8(b) on the vertical axis versus the distance between the principle point of a lenticular lens and the conjugate point of a reflection surface with respect to a convergence lens.
Figure 9B:
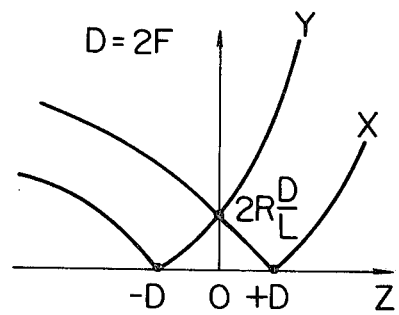
Figure 9C:
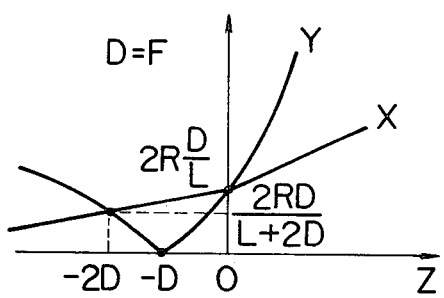
Figure 9D:
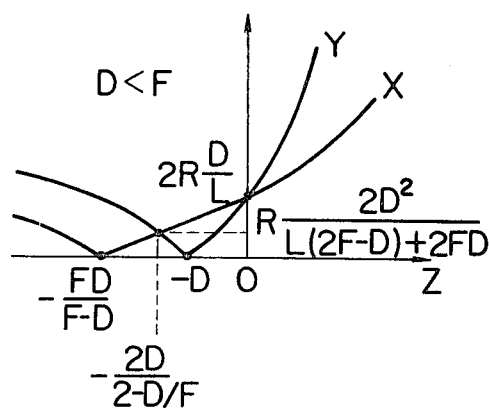

Therefore, in the present invention, the lens 8 and the light receiving element 9 are arranged so that the curves shown in FIGS. 9*a* and 9*b* are produced, i.e., D>F. Particularly, in the case when D=2F, the curve is as shown in FIG. 9*b* with the peaks symmetrically produced about the Z axis. This case is deemed to be the optimum condition for servo control.

Furthermore, since it may be necessary to receive the light having cross sectional contours from circle with $X=Y=2R \cdot D/L$ is an ellipse whose longitudinal diameter is equal to or larger than $2R \cdot D/L$. The widths M and N of the light receiving element should be larger than $2R \cdot D/L$, respectively. That is, as shown in FIG. 8*b,* the width N and height M of the element 9 in the direction where y is parallel to the main line of the lens 8 and in the direction x perpendicular to y are selected as larger than $2R \cdot D/L$, respectively.

As described hereinabove, in the present invention, it becomes possible to obtain an optimum output from the element 9 by suitably selecting the distance between the lens 8 and the element 9, respectively in a focus servo without error.

Although, in the embodiment described hereinbefore, the invention is applied to the reflection type recording and reproducing system, in which the focus servo is performed by separating the light from the recording surface into the illuminating light and the reflection light by using the beam splitter 3. The present invention can also be applied to the transmission type recording and reproducing system. In the latter case, a condenser lens for a light passed through the recording surface and a condenser lens for illumination light may be separately provided.

It is apparent that other modifications of this invention can be made without departing from the scope therefrom.

What is claimed is:

1. In a focus servo apparatus in which an information recording surface of a recording medium is illuminated with light from an illumination source and information recorded on the recording surface is read out by using light reflected from the recording surface, the improvement comprising; a condenser lens for condensing the light from the recording surface, a cylindrical lens for passing the condensed light, light receiving means having a light receiving surface positioned for receiving the light from said cylindrical lens, a distance D between said cylindrical lens and said light receiving means being larger than the focus distance F of said cylindrical lens, and means responsive to an output of said light receiving means moving said condenser lens for condensing the illumination light onto the recording surface of said recording medium.

2. A focus servo apparatus claimed in claim 1, wherein said distance D is selected to be twice the focus distance F.

3. A focus servo apparatus claimed in claims 1 or 2, wherein the principle point of said cylindrical lens is positioned in the vicinity of a conjugate point at which the light from said recording medium is condensed by said condenser lens.

4. A focus servo apparatus claimed in claims 1 or 2, wherein said light receiving surface portion of said light receiving means has dimensions in directions parallel and orthognal to a main line of said cylindrical lens larger than $2R \cdot D/L$, respectively, where R is a radius of said condenser lens, and L is the distance between said condenser lens and said cylindrical lens.

5. A focus servo apparatus as claimed in claim 1 wherein said means moving said condenser lens for condensing the illumination light comprises a differential amplifier and a lens drive circuit for moving said condenser lens in response to the output of said differential amplifier.

6. A focus servo apparatus as claimed in claim 5 wherein said light receiving surface portion comprises an array of light receiving elements, and said light receiving means further comprises means for summing outputs from opposite elements in said array.

7. A focus servo apparatus as claimed in claim 6 wherein said array is diamond shaped having four rectangular elements.

8. A focus servo apparatus as claimed in claim 1 further comprising a beam splitter interposed between said illumination source and said condenser lens.

* * * * *